Oct. 18, 1927.  
J. KARASEVICH  
1,645,953  
TROUBLE LAMP FOR MOTOR VEHICLES  
Filed Feb. 18, 1927
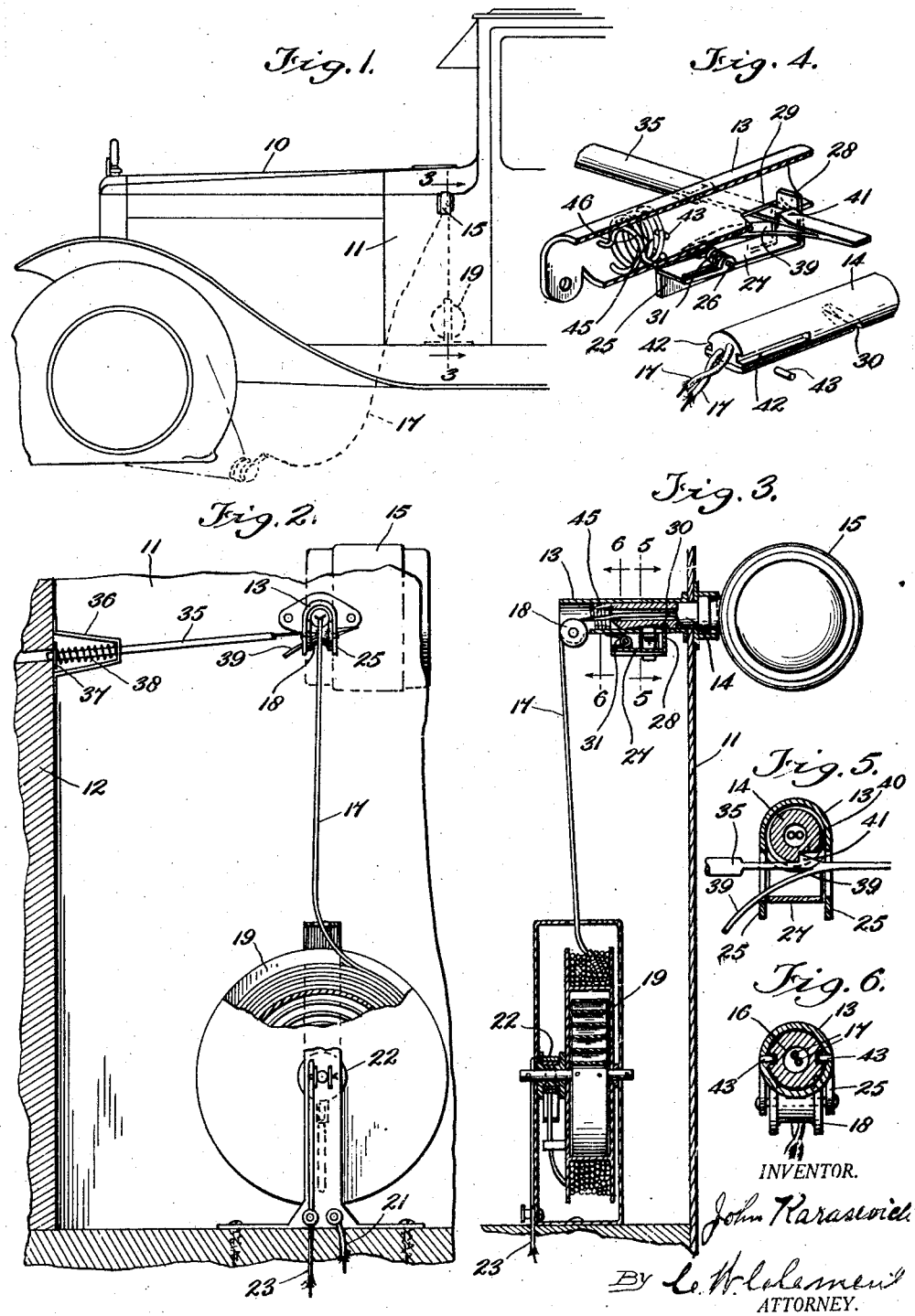
INVENTOR.  
John Karasevich  
BY L. W. Coleman  
ATTORNEY.

Patented Oct. 18, 1927.

1,645,953

UNITED STATES PATENT OFFICE.

JOHN KARASEVICH, OF MOUNT CARMEL, PENNSYLVANIA.

TROUBLE LAMP FOR MOTOR VEHICLES.

Application filed February 18, 1927. Serial No. 169,248.

This invention relates to automobile lamps and more particularly to a trouble lamp for motor vehicles and has for one of its objects to provide a device of this character which will be simple in construction, comparatively inexpensive to manufacture and install and more efficient in use than those which have been heretofore proposed.

A further object of the invention is to provide a trouble light for automobiles and the like which may also be employed as one of the running lights of the vehicle.

A still further object of the invention is to provide a trouble lamp of the type having an extension cord carried by a spring reel, which lamp is normally positioned in a socket provided in the automobile body and securely locked therein, but which in case of necessity may be readily released and withdrawn from the said scoket whereby it may be readily carried to any part of the car where its presence may be desired.

With the above and other objects in view which will appear as the description proceeds, the invention consists in the novel details of construction and combinations and arrangements of parts more fully hereinafter described and particularly pointed out in the appended claims.

Referring to the accompanying drawings forming a part of this specification in which like reference characters designate like parts in all the views:

Figure 1 is a fragmentary side elevational view of a motor vehicle equipped with a lamp constructed in accordance with the present invention;

Fig. 2 is an interior elevational view of the cowl portion of the vehicle shown in Fig. 1, showing the trouble lamp constituting the present invention in place thereon, a portion of the parts being shown in section;

Fig. 3 is an enlarged transverse sectional view taken approximately on the plane indicated by the line 3—3 of Fig. 1;

Fig. 4 is a sectional perspective view of the socket or sleeve which receives the stem of the lamp proper and showing the locking means employed for positively retaining the said stem within the sleeve;

Fig. 5 is an enlarged transverse sectional view taken approximately on the plane indicated by the line 5—5 of Fig. 3, but showing the parts in the positions assumed when the lamp is withdrawn from the socket; and, Fig. 6 is a transverse sectional view taken approximately on the plane indicated by the line 6—6 of Fig. 3.

Referring more particularly to the said drawings the numeral 10 indicates generally the body of a motor vehicle which is provided with the usual cowl panel 11 which may be carried by the vehicle frame 12. The vertical or side portions of the cowl panel are provided with a pair of sleeves or sockets 13, only one of which is shown, since they are substantial duplicates of one another and which are preferably mounted in the positions usually occupied by the well known cowl running lights. The said sockets comprise substantially tubular sleeves which are secured to the cowl panel 11 in any suitable manner and which are adapted to slidably receive the stem 14, rigidly carried by the lamp housing 15, containing the usual electric bulb not shown. The said stem 14 is provided with an axial bore 16 to accommodate the electric wires 17 for feeding the said lamp, which wires pass around a pulley 18 journalled in the inner end of the sleeve or socket 13 and thence downwardly to a spring controlled reel or drum 19 mounted upon the floor of the vehicle within the cowl panel 11. One of the wires 17 is preferably grounded upon the frame of the reel in the usual well known manner, which frame in turn is either grounded by means of a wire 21 to the vehicle frame or is connected to one pole of the vehicle battery. The other end of the said wire 17 is connected through a slip ring device 22 to the wire 23 which is connected to the other pole of the said battery.

The sleeve or socket 13 is provided with a pair of downwardly extending ears 25 in which is pivotally mounted on the shaft 26, a catch member 27 having an angularly extending end or toe 28 which projects upwardly through an aperture 29 formed in the bottom of the sleeve 13 to engage a notch or recess 30 formed in the stem 14, as will be clear from Fig. 3. A coil spring 31 surrounds the shaft 26 and normally urges the said toe 28 upwardly into locking position, as will be readily understood.

In order that the toe 28 may be disengaged from the notch 30 when it is desired to withdraw the stem 14 from the socket, there is provided a rod 35 which extends parallel to the cowl panel 11 through a bracket 36 carried by the vehicle frame member 12, as will be clear from Figs. 2 and 4. The end of the rod 35 is provided with a rigid washer or button 37 and a coil spring 38 is interposed between the said washer 37 and the bracket 36 as will be clear from Fig. 2, to normally urge the rod 35 toward the left, as viewed in the said figure.

The other end of the rod 35 is preferably flattened as shown and is provided with a rigidly carried flat spring member 39 which curves downwardly as clearly shown in the drawings, to engage the catch member 27. When the rod 35 is manually moved toward the right, as viewed in Fig. 2, the flat spring 39 will force the catch member 27 downwardly against the influence of the spring 31 to withdraw the toe 28 from the notch 30 and thereby permit the withdrawal of the stem 14 from the sleeve 13. When the rod 35 is thus moved toward the right to disengage the catch 27, a shoulder 41 formed upon the reduced end of the said rod engages a groove 40 formed in the under surface of the stem 14, as clearly indicated in Fig. 5, to retain the catch 27 in released position in order to facilitate the withdrawal of the said stem 14 from the sleeve.

In order to guide the stem properly during its reentrance, it is provided with a pair of oppositely disposed grooves 42 which are adapted to engage a pair of oppositely disposed pins 43 carried by the sleeve 13, (see Figs. 4 and 6,) which pins, of course, make it necessary that the stem occupy a definite angular position relative to the sleeve before it can be fully inserted therein.

A cushioning spring 45 is mounted within the sleeve behind the pins 43 and is retained in place by means of a staple like member 46, as will be clear from Fig. 4. This said spring 45 serves to cushion the entrance of the stem 14 and also to hold it against rattling after it is fully entered and locked in place.

The manner of using the lamp will be clear from the foregoing, it being understood that it normally occupies a position upon the cowl panel 11 where it may be employed as a running light. In the event it is desirable to have a trouble lamp, however, by merely moving the rod 35 toward the right, as viewed in Fig. 2, to cause its spring member 39 to depress the catch 27, the lamp casing 15 together with the stem 14 may be readily removed and taken to any desired point around the machine. The wires or cable 17 will be unwound from the spring reel in the well known manner and drawn through the sleeve 13 as will be readily understood. After the trouble has been overcome and it is desired to return the lamp to its normal position, the spring reel will rewind the cable and the stem may be readily reinserted into the sleeve 13 until the toe 28 engages the notch 30.

While one form of the invention has been thus illustrated and described, it is obvious that those skilled in the art may vary the details of construction as well as the precise arrangements of parts without departing from the spirit of the invention and therefore, it is not wished to be limited to the above disclosure except as may be required by the claims.

What is claimed is:

1. A trouble lamp for vehicles comprising a socket adapted to be secured to a vehicle body; a lamp casing having a stem provided with a recess, removably received in said socket; a spring pressed catch having a toe for engaging said notch to normally prevent the withdrawal of said stem from said socket; means for moving said catch against its spring to disengage said toe from said recess; and means carried by said catch moving means for engaging said stem to maintain the parts with said toe in disengaged position.

2. A trouble lamp for vehicles comprising a socket adapted to be secured to a vehicle body; a lamp casing having a stem removably received in said socket; a catch for normally preventing the withdrawal of said stem from said socket; and an anti-rattling and cushioning spring mounted in said socket, engageable by said stem.

3. A trouble lamp for vehicles comprising a socket adapted to be secured to a vehicle body; a lamp casing having a stem removably received in said socket; a catch for normally preventing the withdrawal of said stem from said socket; an anti-rattling and cushioning spring mounted in said socket, engageable by said stem; and means comprising pins carried by said socket and grooves formed in said stem for guiding said stem in said socket, said pins also assisting in maintaining said cushioning spring in said socket.

In testimony whereof I affix my signature.

JOHN KARASEVICH.